United States Patent
Lim et al.

(10) Patent No.: US 11,770,245 B2
(45) Date of Patent: Sep. 26, 2023

(54) QUANTUM KEY DISTRIBUTION SYSTEM AND OPERATION METHOD THEREOF

(71) Applicant: ELECTRONICS AND TELECOMMUNICATIONS RESEARCH INSTITUTE, Daejeon (KR)

(72) Inventors: Kyongchun Lim, Daejeon (KR); Chun Ju Youn, Daejeon (KR); Byung-seok Choi, Daejeon (KR); Young-Ho Ko, Daejeon (KR); Kap-Joong Kim, Daejeon (KR); Minchul Kim, Daejeon (KR); Ju Hee Baek, Daejeon (KR); Joong-Seon Choe, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 38 days.

(21) Appl. No.: 17/488,955

(22) Filed: Sep. 29, 2021

(65) Prior Publication Data
US 2022/0141008 A1     May 5, 2022

(30) Foreign Application Priority Data

Nov. 4, 2020 (KR) .................. 10-2020-0146231
Aug. 4, 2021 (KR) .................. 10-2021-0102626

(51) Int. Cl.
H04L 9/08 (2006.01)

(52) U.S. Cl.
CPC .......... *H04L 9/0855* (2013.01); *H04L 9/0825* (2013.01); *H04L 9/0858* (2013.01)

(58) Field of Classification Search
CPC ... H04L 9/0855; H04L 9/0825; H04L 9/0858; H04L 9/08; H04L 9/0869; H04L 9/085; H04L 9/088
See application file for complete search history.

(56) References Cited

U.S. PATENT DOCUMENTS 7,333,611 B1 * 2/2008 Yuen ............... H04B 10/70
                                                    380/256
7,496,203 B2    2/2009 Choi et al.
(Continued)

OTHER PUBLICATIONS

Donghwa Lee et al., "Reference-Frame-Independent, Measurement-Device-Independent quantum key distribution using fewer quantum states", Optics Letters, pp. 1-6, May 7, 2020.

*Primary Examiner* — Quazi Farooqui
(74) *Attorney, Agent, or Firm* — Rabin & Berdo, P.C.

(57) ABSTRACT

Disclosed is a quantum key distribution system using an RFI (reference frame independent) QKD (quantum key distribution) protocol, which includes a first signal processing circuit that generates transmission basis information and transmission bit information, a quantum channel transmitter that generates a single photon or coherent light, and modulates the single photon or the coherent light based on the transmission basis information and the transmission bit information to generate a quantum signal, a quantum channel receiver that receives the quantum signal through a quantum channel and detects reception bit information from the quantum signal based on reception basis information, and a second signal processing circuit that generates the reception basis information, transmits the reception basis information to the first signal processing circuit through a public channel, and receives the transmission basis information from the first signal processing circuit through the public channel.

19 Claims, 7 Drawing Sheets

(56) References Cited

U.S. PATENT DOCUMENTS

| | | |
|---|---|---|
| 9,219,605 B2 | 12/2015 | Niskanen et al. |
| 10,341,096 B1 * | 7/2019 | Lentine ................. H04L 9/0858 |
| 10,567,169 B2 | 2/2020 | Hong et al. |
| 2017/0264434 A1 * | 9/2017 | Takahashi ............. H04L 9/0858 |

* cited by examiner

QUANTUM KEY DISTRIBUTION SYSTEM AND OPERATION METHOD THEREOF

CROSS-REFERENCE TO RELATED APPLICATIONS

This application claims priority under 35 U.S.C. § 119 to Korean Patent Application Nos. 10-2020-0146231, filed on Nov. 4, 2020, and 10-2021-0102626, filed on Aug. 4, 2021, in the Korean Intellectual Property Office, the disclosures of which are incorporated by reference herein in their entireties.

BACKGROUND

Embodiments of the present disclosure described herein relate to a quantum key distribution system (QKD), and more particularly, relate to a quantum key distribution system based on an RFI (reference frame independent) QKD protocol that operates regardless of a reference axis and an operation method of thereof.

Most encryption systems currently used for communication are based on mathematical complexity and are reversible, so someday the encryption will be unlocked. One of the techniques for resolving this problem is quantum cryptography communication, in particular, quantum key distribution (QKD) technique. Whereas most existing cryptosystems are mostly based on mathematical complexity, the quantum cryptography is based on natural phenomena and is one of the ideal methods for generating one-time encryption keys used in cryptosystems. In the case of quantum cryptography, when an eavesdropper (Eve) intrudes in the middle of communication, a signal is distorted which infers information leakage to Eve. Therefore, the corresponding information leakage can be removed to obtain security. The QKD system is a system that allows a transmitter (Alice) and a receiver (Bob) to share the quantum cryptography with these characteristics.

The QKD protocol is used as a means to enable symmetric key-based quantum cryptographic communication that provides unconditional security using quantum mechanical properties. To perform the symmetric key-based quantum cryptographic communication, a transmitter and a receiver, the subject of communication, should share the same encryption key. The QKD protocol is responsible for securely sharing the encryption key. In the QKD protocol, encryption key information uses the physical properties of photons such as polarization or phase, and these properties have relative values. Therefore, encryption key information is defined based on a specific reference axis between the transmitter and the receiver. The QKD protocol exchanges encryption key information based on an initially defined reference axis, but the reference axis may change in real time due to the influence of the external environment. This eventually prevents sharing of the same encryption key information. To solve this problem, the RFI QKD protocol that operates independently of the reference axis is proposed.

SUMMARY

Embodiments of the present disclosure provide a QKD system and an operating method thereof that do not have any security problems even under realistic conditions, based on an RFI QKD protocol with minimal physical properties.

According to an embodiment of the present disclosure, a quantum key distribution system uses an RFI (reference frame independent) QKD (quantum key distribution) protocol. The quantum key distribution system includes a first signal processing circuit that generates transmission basis information and transmission bit information, a quantum channel transmitter that generates a single photon or coherent light, and modulates the single photon or the coherent light based on the transmission basis information and the transmission bit information to generate a quantum signal, a quantum channel receiver that receives the quantum signal through a quantum channel and detects reception bit information from the quantum signal based on reception basis information, and a second signal processing circuit that generates the reception basis information, transmits the reception basis information to the first signal processing circuit through a public channel, and receives the transmission basis information from the first signal processing circuit through the public channel. At least one of the first and the second signal processing circuits measures a plurality of security parameters based on the transmission basis information and the reception basis information, and generates a quantum key based on the plurality of security parameters.

According to an embodiment, the quantum channel transmitter may include a light source that generates the single photon or the coherent light, an intensity modulator connected to the light source and that changes an intensity of the coherent light when the coherent light is received from the light source, a quantum information modulator that modulates the single photon or the coherent light to reflect the transmission basis information and the transmission bit information, and an optical attenuator that attenuates an intensity of a signal output from the quantum information modulator to generate the quantum signal.

According to an embodiment, the quantum channel receiver may include a quantum information demodulator that receives the quantum signal from the optical attenuator through the quantum channel and demodulates the quantum signal based on the reception basis information, and a single photon detector that detects the reception bit information from the demodulated quantum signal.

According to an embodiment, the first and the second signal processing circuits may share the transmission basis information and the reception basis information with each other, and the at least one of the first and the second signal processing circuits may be configured to combine the transmission basis information and the reception basis information to obtain pair of bases information.

According to an embodiment, the pair of bases information may include first pair of bases information and second pair of bases information, the first pair of bases information may include polarization state information associated with a first pair of bases composed of circular polarization components, and the second pair of bases information may include polarization state information associated with a plurality of second pair of bases composed of linear polarization components.

According to an embodiment, the at least one of the first and the second signal processing circuits may be configured to obtain quantum bit error rate (QBER) information based on the first pair of bases information, and to correct a bit error generated in the reception bit information, based on the QBER information.

According to an embodiment, the at least one of the first and the second signal processing circuits may be configured to measure the plurality of security parameters based on the second pair of bases information, and the plurality of security parameters may include a first security parameter associated with all of the plurality of second pairs of bases, a second security parameter associated with some of the plurality of second pairs of bases, and a third security parameter calculated based on the first security parameter and the second security parameter.

According to an embodiment, the third security parameter may be a value obtained by subtracting the first security parameter from the second security parameter.

According to an embodiment, the at least one of the first and the second signal processing circuits may be configured to measure a plurality of third security parameters corresponding to a plurality of pre-stored misaligned angles, and to calculate a maximum value of the plurality of third security parameters, and wherein each of the misaligned angles may be an angle between a reference axis of the quantum channel transmitter and a reference axis of the quantum channel receiver.

According to an embodiment, the at least one of the first and the second signal processing circuits may be configured to determine a lower limit value of the first security parameter by subtracting the maximum value of the plurality of third security parameters from the second security parameter, and to generate the quantum key resulting from privacy amplification which removes an eavesdropped bit from the reception bit information based on the lower limit value of the first security parameter.

According to an embodiment of the present disclosure, a method of operating a quantum key distribution system uses an RFI (reference frame independent) QKD (quantum key distribution) protocol. The method of operating a quantum key distribution system includes transmitting and receiving a quantum signal through a quantum channel based on transmission basis information, transmission bit information, reception basis information, and reception bit information, obtaining pair of bases information composed of a combination of the transmission basis information and the reception basis information, obtaining quantum bit error rate (QBER) information based on the pair of bases information, measuring a plurality of security parameters based on the pair of bases information, correcting a bit error of the reception bit information based on the QBER information, and generating a secret key based on the plurality of security parameters.

According to an embodiment, the transmitting and receiving of the quantum signal may include generating a single photon or coherent light, generating the quantum signal by modulating the single photon or the coherent light, based on the transmission basis information and the transmission bit information, demodulating the quantum signal that passes through the quantum channel based on the reception basis information, and detecting the reception bit information from the demodulated quantum signal.

According to an embodiment, the obtaining of the pair of bases information may include obtaining first pair of bases information including polarization state information associated with a first pair of bases composed of circular polarization components, and obtaining second pair of bases information including polarization state information associated with a plurality of second pairs of bases composed of linear polarization components.

According to an embodiment, the obtaining of the QBER information may include obtaining the QBER information based on the first pair of bases information, and correcting the bit error generated in the reception bit information based on the QBER information.

According to an embodiment, the measuring of the plurality of security parameters may include measuring a first security parameter associated with all of the plurality of second pairs of bases and a second security parameter associated with some of the plurality of second pairs of bases, based on the second pair of bases information, and loading a pre-stored maximum value of the third security parameter, and the third security parameter may be a value obtained by subtracting the first security parameter from the second security parameter.

According to an embodiment, the pre-stored maximum value of the third security parameter may be a maximum value among a plurality of third security parameters corresponding to a plurality of pre-stored misaligned angles, and each of the misaligned angles may be an angle between a reference axis of a transmitting device and a reference axis of a receiving device.

According to an embodiment, the measuring of the security parameters may further include determining a lower limit value of the first security parameter by subtracting the pre-stored maximum value of the third security parameter from the second security parameter.

According to an embodiment, the generating of the secret key may include generating the secret key resulting from privacy amplification which removes an eavesdropped bit from the reception bit information based on the lower limit value of the first security parameter.

According to an embodiment of the present disclosure, a method of operating a quantum key distribution system uses an RFI (reference frame independent) QKD (quantum key distribution) protocol. The method of operating a quantum key distribution system includes setting a plurality of misaligned angles, transmitting and receiving a quantum signal based on transmission basis information, transmission bit information, reception basis information, and reception bit information, with respect to each of the plurality of misaligned angles, measuring a first security parameter and a second security parameter based on the transmission basis information and the reception basis information, measuring a plurality of third security parameters corresponding to the plurality of misaligned angles based on the first security parameter and the second security parameter, and measuring a maximum value of the plurality of third security parameters and storing the maximum value. Each of the plurality of misaligned angles is an angle between a reference axis of a transmitting device and a reference axis of a receiving device.

According to an embodiment, the first security parameter may be associated with all of a plurality of pairs of bases composed of linear polarization components, the second security parameter may be associated with some of the plurality of pairs of bases composed of the linear polarization components, and the third security parameter may be a value obtained by subtracting the first security parameter from the second security parameter.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described clearly and in detail such that those skilled in the art may easily carry out the present disclosure. However, since the present disclosure may be embodied in various different forms within the scope of the claims, the embodiments described below are merely examples, regardless of whether they are expressed or not. That is, the present disclosure is not limited to the embodiments disclosed below and may be implemented in various different forms.

Figure 1:
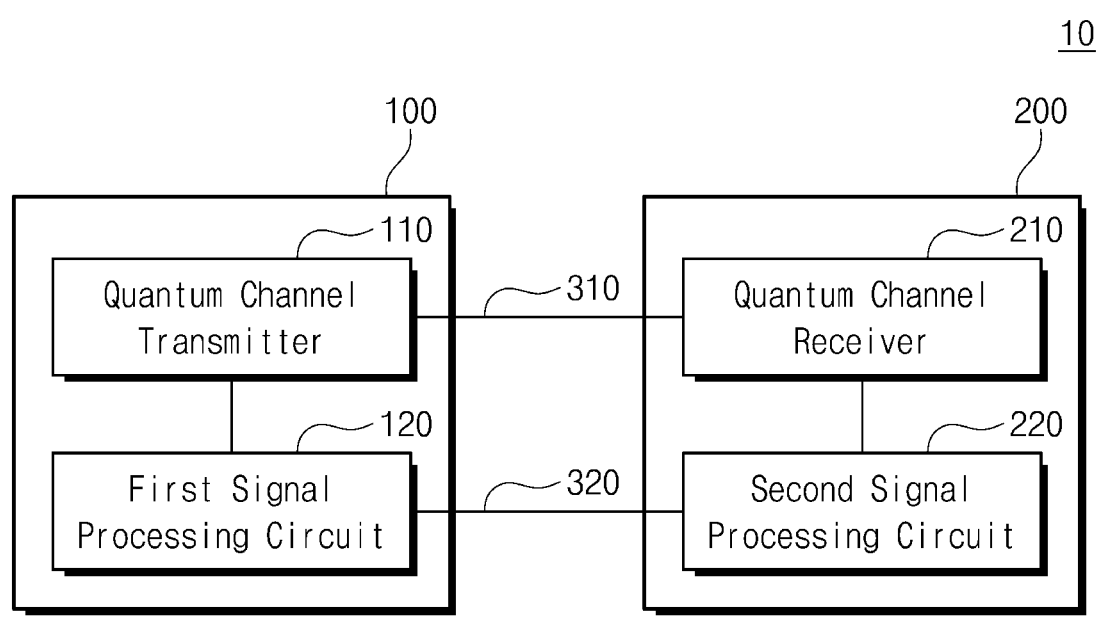
FIG. 1 is a block diagram of a quantum key distribution system according to an embodiment of the present disclosure.

FIG. 1 is a block diagram of a quantum key distribution system according to an embodiment of the present disclosure. Referring to FIG. 1, a QKD system 10 may include a transmitting device 100, a receiving device 200, a quantum channel 310, and a public (open) channel 320.

The QKD system 10 may perform quantum cryptographic communication through an RFI QKD protocol. That is, the transmitting device 100 and the receiving device 200 may distribute an encryption key based on the RFI QKD protocol. The transmitting device 100 and the receiving device 200 may share encryption key information through the RFI QKD protocol regardless of a reference axis between the transmitting device 100 and the receiving device 200.

For example, a polarization-based RFI QKD protocol may use two circular polarizations in addition to four linear polarizations. The linear polarizations may have physical properties (0°, 90°, 45°, −45°) related to the reference axis, and the circular polarizations may have physical properties (left circular and right circular) independent of the reference axis. Hereinafter, a combination of mutually orthogonal polarization states is defined as a base, 0° and 90° polarizations are defined as a Z base, 45° and −45° polarizations are defined as an X base, and left-circular and right-circular polarizations are defined as a Y base.

The QKD system 10 may perform a post-processing operation based on at least one of the bases having six physical properties (or polarization states). The post-processing operation may include an error correction operation and a privacy amplification operation that are performed based on transmitted and received quantum signals. However, as physical properties are added, additional components for generating and detecting the added physical properties may be required. Accordingly, the QKD system 10 may perform the post-processing operation using minimal physical properties. A detailed description thereof will be described later with reference to FIG. 6.

The transmitting device 100 may carry encryption key information on a single photon or coherent light in a manner that modulates the phase or polarization of the single photon or the coherent light, and then may transmit it through the quantum channel 310. The receiving device 200 may extract the encryption key information from the single photon or the coherent light. In the following specification, for convenience of description, the transmitting device 100 and the receiving device 200 are described as transmitting and receiving the single photon or the coherent light based on a polarization modulation method, but the present disclosure is not limited thereto. According to an embodiment, the transmitting device 100 and the receiving device 200 may transmit/receive the single photon or the coherent light based on a phase modulation method.

The transmitting device 100 may include a quantum channel transmitter 110 and a first signal processing circuit 120. The quantum channel transmitter 110 may generate a single photon or coherent light, and may perform a modulation operation for including quantum information to the generated single photon or the generated coherent light. The quantum channel transmitter 110 may transmit a quantum signal to the receiving device 200 through the quantum channel 310. A quantum signal may include the single photon or the coherent light including the quantum information.

The first signal processing circuit 120 may generate and store information for quantum key distribution. For example, the information for quantum key distribution may include transmission bit information (or transmission state information) and transmission basis information. The first signal processing circuit 120 may control an operation of the quantum channel transmitter 110 based on the information for the quantum key distribution.

The first signal processing circuit 120 may be connected to the receiving device 200 through the public channel 320 to share the information for the quantum key distribution and post-processing information with the receiving device 200. The first signal processing circuit 120 may perform a post-processing operation based on the post-processing information. The post-processing information may include a QBER (Quantum Bit Error Rate) information and security parameter information. The first signal processing circuit 120 may perform an error correction operation and a privacy amplification (or confidentiality amplification) operation based on the post-processing information.

The receiving device 200 may include a quantum channel receiver 210 and a second signal processing circuit 220. The quantum channel receiver 210 may receive the quantum signal transmitted from the quantum channel transmitter 110 through the quantum channel 310 and may perform a demodulation operation on the quantum signal. For example, the quantum channel receiver 210 may perform a demodulation operation based on reception basis information to extract reception bit information (or reception state information). The second signal processing circuit 220 may arbitrarily select and store the reception basis information.

The second signal processing circuit 220 may be connected to the transmitting device 100 through the public channel 320 to share the reception basis information, the reception bit information, and the post-processing information with the transmitting device 100. The second signal processing circuit 220 may perform a post-processing operation based on the post-processing information. The post-processing information may include the QBER information and the security parameter information. The second signal processing circuit 220 may perform an error correction operation and a privacy amplification (or confidentiality amplification) operation based on the post-processing information.

The first signal processing circuit 120 and the second signal processing circuit 220 may share the post-processing information, and may extract an error-corrected and secure encryption key. The first signal processing circuit 120 and the second signal processing circuit 220 may reduce a length of a bit string of the encryption key through the post-processing operation. That is, the post-processing operation may amplify the security of the encryption key.

Figure 2:
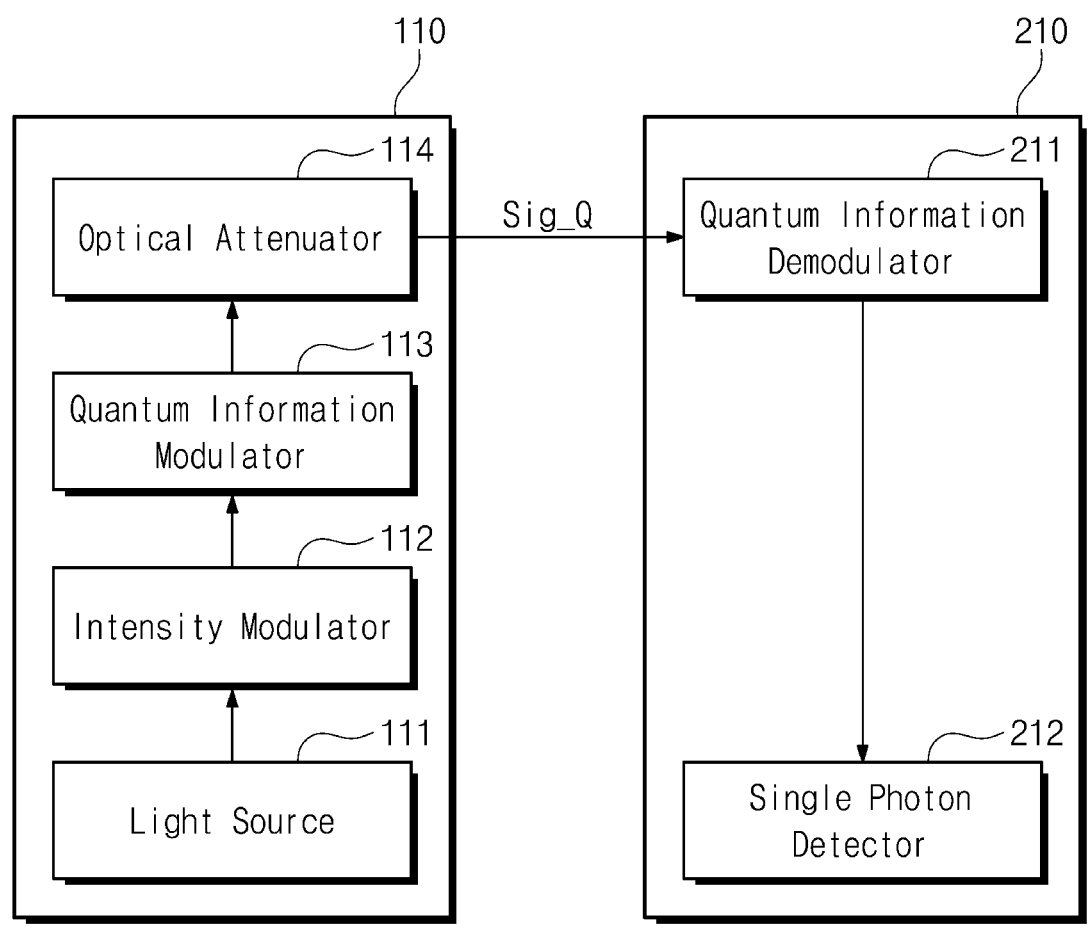
FIG. 2 is a block diagram illustrating an example of a quantum channel transmitter and a quantum channel receiver of FIG. 1.

FIG. 2 is a block diagram illustrating an example of a quantum channel transmitter and a quantum channel receiver of FIG. 1. Referring to FIGS. 1 and 2, the quantum channel transmitter 110 may include a light source 111, an intensity modulator 112, a quantum information modulator 113, and an optical attenuator 114, and the quantum channel receiver 210 may include a quantum information demodulator 211 and a single photon detector 212.

The light source 111 may generate a single photon or coherent light. According to an embodiment, the light source 111 may include a single photon light source or a laser in which the emitted light has a single mode, and has a narrow linewidth and stable polarization characteristics. The coherent light generated by the light source 111 may be incident on the intensity modulator 112. The intensity modulator 112 may be connected to the light source 111 to adjust an intensity of the coherent light. For example, the intensity modulator 112 may reduce the intensity of the coherent light to a predetermined intensity or less.

The quantum information modulator 113 may be connected to the intensity modulator 112 to carry quantum information to the single photon or the coherent light. The quantum information may include polarization state information of a photon to be transmitted. The quantum information modulator 113 may generate the quantum information by modulating the transmission bit information, based on the transmission basis information generated by the first signal processing circuit 120. The transmission basis information may be arbitrarily selected by the first signal processing circuit 120.

The optical attenuator 114 may attenuate the intensity of a modulated signal including the quantum information. The optical attenuator 114 may generate a quantum signal Sig_Q having a signal intensity equal to or less than a reference intensity. The optical attenuator 114 may generate the quantum signal Sig_Q and may transmit it to the quantum information demodulator 211 through the quantum channel 310.

According to an embodiment, the intensity modulator 112 or the optical attenuator 114 may be omitted. In this case, the quantum information modulator 113 may output the quantum signal Sig_Q including the quantum information.

The quantum information demodulator 211 may receive the quantum signal Sig_Q. The quantum information demodulator 211 may adjust quantum characteristics of the quantum signal Sig_Q by demodulating the quantum information. For example, the quantum information demodulator 211 may receive the reception basis information from the second signal processing circuit 220 and may maintain or change the polarization state information of the quantum signal Sig_Q, based on the reception basis information.

The single photon detector 212 may be connected to the quantum information demodulator 211 to detect the demodulated quantum signal Sig_Q. For example, the single photon detector 212 may measure a polarization state of the quantum signal Sig_Q and may provide measurement information to the second signal processing circuit 220. For example, the measurement information may include the reception bit information. The second signal processing circuit 220 may generate the encryption key through the post-processing operation based on the reception bit information.

Figure 3:
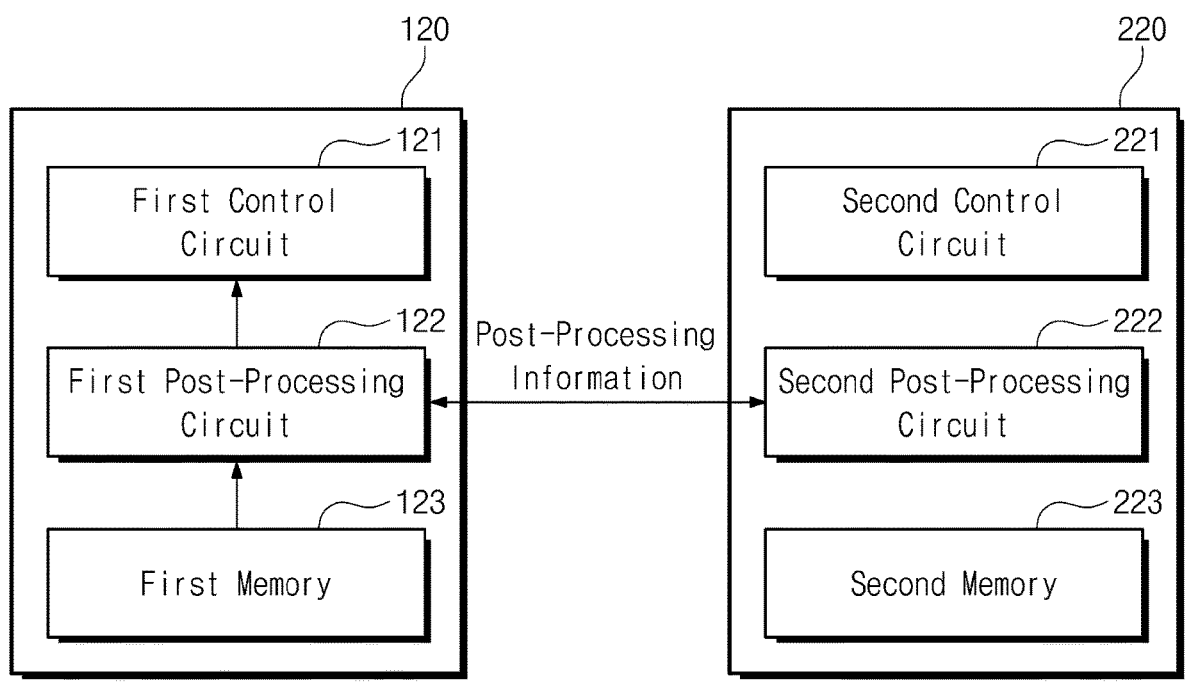
FIG. 3 is a block diagram illustrating an example of a first signal processing circuit and a second signal processing circuit of FIG. 1.

FIG. 3 is a block diagram illustrating an example of the first signal processing circuit and the second signal processing circuit of FIG. 1. Referring to FIGS. 1 and 3, the first signal processing circuit 120 may include a first control circuit 121, a first post-processing circuit 122, and a first memory 123.

The first control circuit 121 may generate a control signal for controlling an operation of the quantum channel transmitter 110. For example, the first control circuit 121 may provide the control signal for controlling to generate a single photon or coherent light to the light source 111. For example, the first control circuit 121 may provide the control signal for controlling the intensity of the coherent light to change to the intensity modulator 112. For example, the first control circuit 121 may generate the transmission bit information and the transmission basis information, and may provide the control signal for controlling to modulate a single photon or coherent light, based on the transmission bit information and the transmission basis information to the quantum information modulator 113. For example, the first control circuit 121 may provide the optical attenuator 114 with the control signal for controlling to generate the quantum signal Sig_Q of an attenuated intensity.

The first post-processing circuit 122 may be configured to perform a post-processing operation of the transmitting device 100. The first post-processing circuit 122 may obtain pair of bases information from the transmitted/received quantum signal, and may classify the pair of bases information into a first pair of bases composed of a circular polarization component and a second pair of bases composed of a linear polarization component. The pair of bases may be composed of a combination of transmission and reception bases.

The first post-processing circuit 122 may measure QBER based on the first pair of bases, and may perform an error correction operation on bits greater than or equal to a reference value. The first post-processing circuit 122 may measure a security parameter based on the second pair of bases. The security parameter is an index related to the amount of information eavesdropped from an eavesdropper, and the first post-processing circuit 122 may perform a privacy amplification operation of removing the eavesdropped information based on the security parameter. The security parameter may include a first security parameter C that is measured through relatively many physical characteristics (or bases), and a second security parameter C' that is measured through relatively few physical characteristics (or bases), and a third security parameter C'−C that is obtained by subtracting the first security parameter C from the second security parameter C'.

The first post-processing circuit 122 may calculate a maximum value of the third security parameter C'−C. The third security parameter C'−C may vary depending on set angles, and when the number of set angles is 'n', the number of third security parameters C'−C may also be 'n'. A detailed description thereof will be described later with reference to FIG. 7.

The first post-processing circuit 122 may calculate a maximum value among the n third security parameters C'−C and may store it in the first memory 123. The operation of calculating the maximum value of the third security parameter C'−C may be performed once at the beginning of manufacturing the QKD system 10. The first post-processing circuit 122 may load the maximum value from the first memory 123 when the privacy amplification operation for the encryption key is performed. The loaded maximum value may be used when the lower limit value of the first security parameter C is calculated.

The first memory 123 may be electrically connected to the first control circuit 121 and the first post-processing circuit 122. The first memory 123 may store basic data associated with a unit, control data for operation control of the unit, and input/output data. For example, the first memory 123 may store the maximum value of the third security parameter C'–C. For example, the first memory 123 may store the transmission bit data, the transmission basis data, reception bit data, and reception basis data. The first memory 123 may be configured as at least one of a ROM, a RAM, an EPROM, a flash drive, and a hard drive in terms of hardware. According to an embodiment, the first memory 123 may be implemented outside the first signal processing circuit 120.

The second signal processing circuit 220 may include a second control circuit 221, a second post-processing circuit 222, and a second memory 223. The second control circuit 221 may generate a control signal for controlling an operation of the quantum channel receiver 210. For example, the second control circuit 221 may generate the reception basis information and may provide a control signal for demodulating a single photon or coherent light to the quantum information demodulator 211, based on the reception basis information. For example, the second control circuit 221 may provide a control signal for controlling to detect quantum information from the demodulated quantum signal to the single photon detector 212.

The second post-processing circuit 222 may be configured to perform a post-processing operation of the receiving device 200. Since an operation of the second post-processing circuit 222 is similar to the operation of the first post-processing circuit 122, additional description thereof will be omitted to avoid redundancy. The second post-processing circuit 222 may calculate the maximum value of the third security parameter C'–C and may store it in the second memory 223. According to an embodiment, the second memory 223 may be implemented outside the second signal processing circuit 220.

The first post-processing circuit 122 and the second post-processing circuit 222 may share the post-processing information. The post-processing information is information necessary for performing the post-processing operation, and may include at least one of the pair of bases information, the QBER information, the security parameter information, the error correction information, and the privacy amplification information. The first post-processing circuit 122 and the second post-processing circuit 222 may perform the post-processing operation together by sharing the post-processing information, but is not limited thereto. According to an example embodiment, the first post-processing circuit 122 and the second post-processing circuit 222 may perform the post-processing operation, respectively, and only one of the first post-processing circuit 122 and the second post-processing circuit 222 may perform the post-processing operation.

Figure 4:
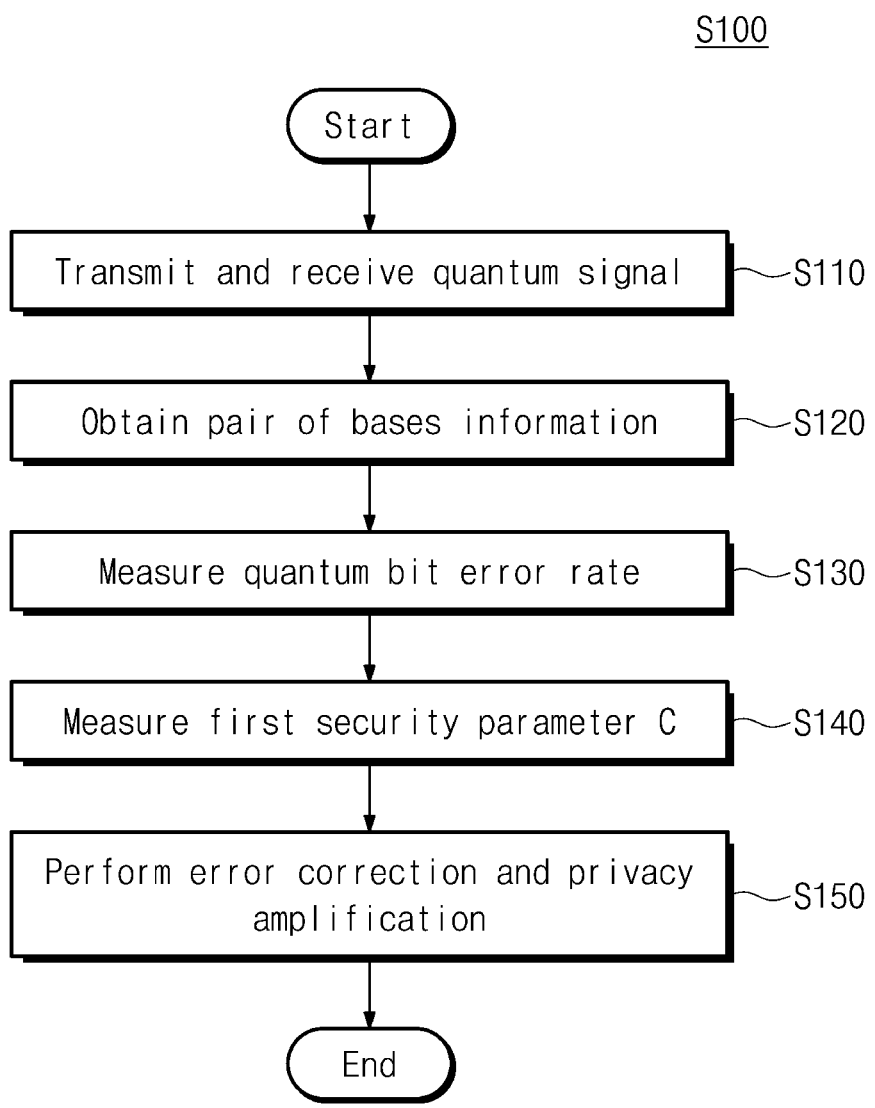
FIGS. 4 and 5 are flowcharts illustrating a method of operating a quantum key distribution system using an RFI QKD protocol.
Figure 5:
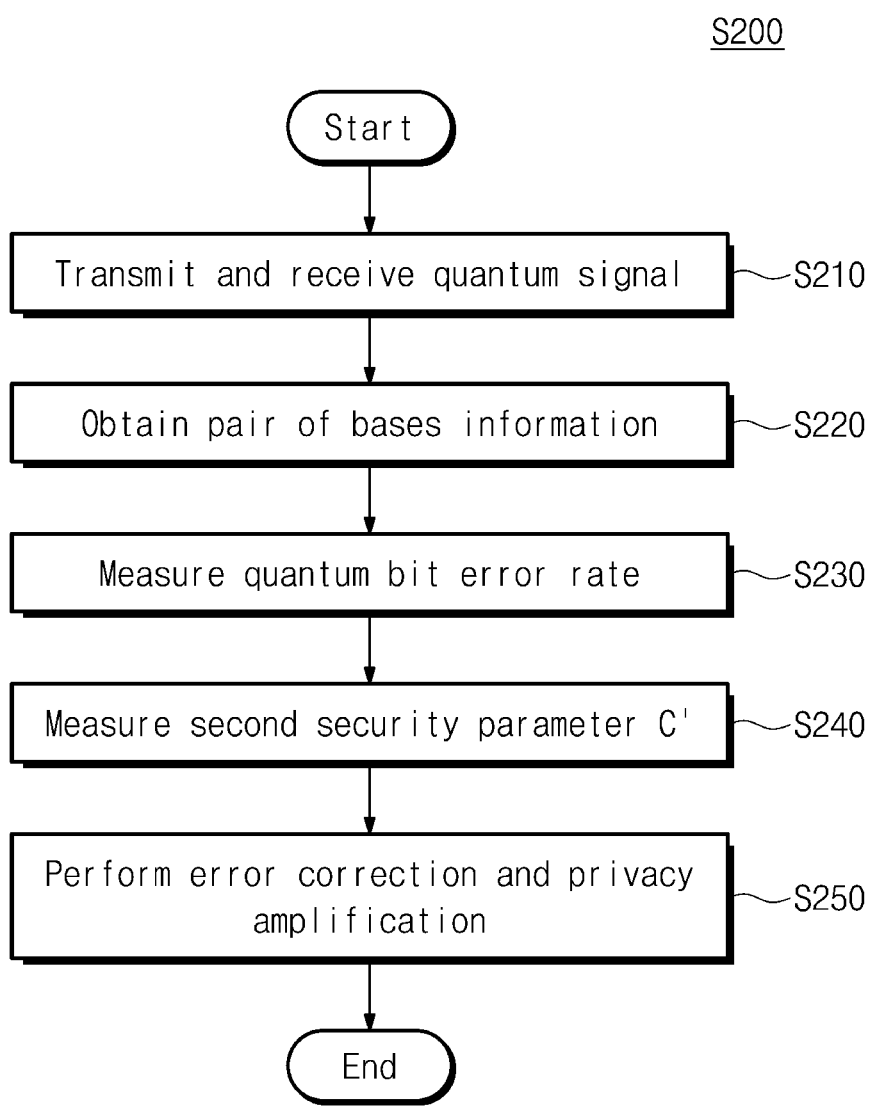

FIGS. 4 and 5 are flowcharts illustrating an operation method of a quantum key distribution system using an RFI QKD protocol. FIG. 4 is an example of an operation method of a QKD system using an RFI QKD protocol, and FIG. 5 is an example of an operation method of the QKD system in which the number of bases is reduced compared to an RFI QKD protocol of FIG. 4.

Referring to FIGS. 1 and 4, in operation S110, the QKD system 10 may transmit and receive a quantum signal. For example, the transmitting device 100 may randomly generate one of three transmission bases $Z_A$, $X_A$, and $Y_A$ in the RFI QKD protocol, and may transmit the quantum signal to the receiving device 200 through the quantum channel 310. The receiving device 200 may arbitrarily select one of the three reception bases $Z_B$, $X_B$, and $Y_B$ to measure the polarization state.

Operation S110 may be operated based on the quantum channel 310 of the QKD system 10. Operations S120 to S150 are operations of operating based on the public channel 320 of the QKD system 10, and may be operations of post-processing the quantum signal generated and transmitted in operation S110.

In operation S120, the QKD system 10 may obtain the pair of bases information based on the transmission basis information and the reception basis information. For example, the receiving device 200 may measure all the polarization states transmitted by the transmitting device 100, and then transmit reception basis information to the transmitting device 100 through the public channel 320. According to an embodiment, the transmitting device 100 may transmit the transmission basis information to the receiving device 200 through the public channel 320. The transmitting device 100 and the receiving device 200 may obtain the pair of bases information by combining the transmission basis information and the reception basis information.

The QKD system 10 may search for a case in which polarization states of specific pairs of bases $Z_A Z_B$, $Z_A X_B$, $X_A Z_B$, $X_A X_B$, and $Y_A Y_B$ are transmitted/received based on the pair of bases information. The specific pairs of bases $Z_A Z_B$, $Z_A X_B$, $X_A Z_B$, $X_A X_B$, and $Y_A Y_B$ may include a first pair of bases $Y_A Y_B$ and second pairs of bases $Z_A Z_B$, $Z_A X_B$, $X_A Z_B$, and $X_A X_B$. The transmission and reception bases of the first pair of bases $Y_A Y_B$ may be composed of only an Y basis of a left-circular polarization and a right-circular polarization. The transmission and reception based of the second pairs of bases $Z_A Z_B$, $Z_A X_B$, $X_A Z_B$, and $X_A X_B$ may be composed of a combination of a Z basis of 0° and 90° polarizations and an X basis of 45° and −45° polarizations. The QKD system 10 may store transmission/reception information of cases in which polarization states of specific pairs of bases $Z_A Z_B$, $Z_A X_B$, $X_A Z_B$, $X_A X_B$, and $Y_A Y_B$ are transmitted/received.

In operation S130, the QKD system 10 may measure the QBER based on the first pair of bases $Y_A Y_B$. For example, the transmitting device 100 and the receiving device 200 may measure the QBER by sharing a part of transmission/reception results when the polarization state of the first pair of bases $Y_A Y_B$ is transmitted and received through the public channel 320.

In operation S140, the QKD system 10 may measure the first security parameter C based on the second pairs of bases $Z_A Z_B$, $Z_A X_B$, $X_A Z_B$, and $X_A X_B$. For example, the transmitting device 100 and the receiving device 200 may share the transmission/reception results when the polarization state of the second pairs of bases $Z_A Z_B$, $Z_A X_B$, $X_A Z_B$, and $X_A X_B$ is transmitted and received through the public channel 320 to measure the first security parameter C.

When the QKD system 10 transmits and receives the polarization state of the second pairs of bases $Z_A Z_B$, $Z_A X_B$, $X_A Z_B$, and $X_A X_B$, the first security parameter C may be used to estimate a possibility of the presence of an eavesdropper by using the result of the transmission/reception. The QKD system 10 may remove eavesdropping information based on the first security parameter C on the RFI QKD protocol. The first security parameter C is defined as in Equation 1, and a lower value of the first security parameter C may mean that there is a greater possibility that an eavesdropper exists.

$$C = C_{Z_A Z_B}^2 + C_{Z_A X_B}^2 + C_{X_A Z_B}^2 + C_{Z_A X_B}^2 \qquad \text{[Equation 1]}$$

Referring to Equation 1, $C_{ij}$ means a correlation when the transmitting device 100 and the receiving device 200 transmit/receive the polarization state of the pair of bases if, and may be expressed as in Equation 2.

$$C_{ij} = \frac{n_{ij}^s - n_{ij}^{ns}}{n_{ij}^s + n_{ij}^{ns}} \qquad \text{[Equation 2]}$$

Referring to Equation 2, when the transmitting device 100 and the receiving device 200 transmit/receive polarization states of a pair of bases ij, $n_{ij}^s$ is the number of cases in which the same polarization state is transmitted and received, and $n_{ij}^{ns}$ is the number of cases in which a different polarization state is transmitted/received.

In operation S150, the QKD system 10 may perform the error correction operation and the privacy amplification operation based on the QBER and the first security parameter C. In this case, since the polarization state of the first pair of bases $Y_A Y_B$ is independent of the reference axis, the QBER may also have a characteristic independent of the reference axis. The QKD system 10 may generate an encryption key with a reduced bit string length through the error correction operation and the privacy amplification operation.

Referring to FIGS. 1, 4, and 5, the QKD system 10 may measure the second security parameter C' instead of the first security parameter C to perform the privacy amplification operation. That is, since operations S210, S220, S230, and S250 are similar to operations S110, S120, S130, and S150 of FIG. 4, additional description thereof will be omitted to avoid redundancy.

The QKD system 10 may transmit/receive a quantum signal in operation S210, and may obtain the pair of bases information in operation S220. In operation S230, the QKD system 10 may measure the QBER based on the first pair of bases $Y_A Y_B$.

In operation S240, the QKD system 10 may measure the second security parameter C' based on some of the second pairs of bases $Z_A Z_B$, $Z_A X_B$, $X_A Z_B$, and $X_A X_B$. For example, the transmitting device 100 and the receiving device 200 may share a transmission/reception result when a polarization state of some of the second pairs of bases $Z_A Z_B$, $Z_A X_B$, $X_A Z_B$, and $X_A X_B$ is transmitted/received through the public channel 320 to measure the second security parameter C'. In this case, the bases may assume an ideal relationship and may be expressed as Equation 3.

$$Z_B = Z_A \cos 2\theta - X_A \sin 2\theta$$

$$X_B = Z_A \sin 2\theta + X_A \cos 2\theta \qquad \text{[Equation 3]}$$

Referring to Equation 3, 'θ' represents an angle at which the reference axes of the transmitting device 100 and the receiving device 200 are misaligned. Under these ideal conditions, Equation 1 may be expressed as Equation 4.

$$C' = 2(C_{Z_A Z_B}^2 + C_{Z_A X_B}^2) \qquad \text{[Equation 4]}$$

Referring to Equation 4, information when the three bases $Z_A$, $Z_B$, and $X_B$ are used to calculate the second security parameter C' is needed. According to an embodiment, the second security parameter C' may use three or less bases. Referring to Equation 1, since the first security parameter C requires information when using the four bases $Z_A$, $Z_B$, $X_A$, and $X_B$, the second security parameter C' may be calculated by using fewer bases than the first security parameter C in Equation 1.

In operation S250, the QKD system 10 may perform the error correction operation and the security amplification operation based on the QBER and the second security parameter C'.

As described above, in an ideal condition, the first security parameter C may be the same as the second security parameter C'. Accordingly, the QKD system 10 may measure the second security parameter C' through Equation 4, and may perform the security amplification operation by using a smaller number of bases than in the case of the measurement of the first security parameter C.

Figure 6:
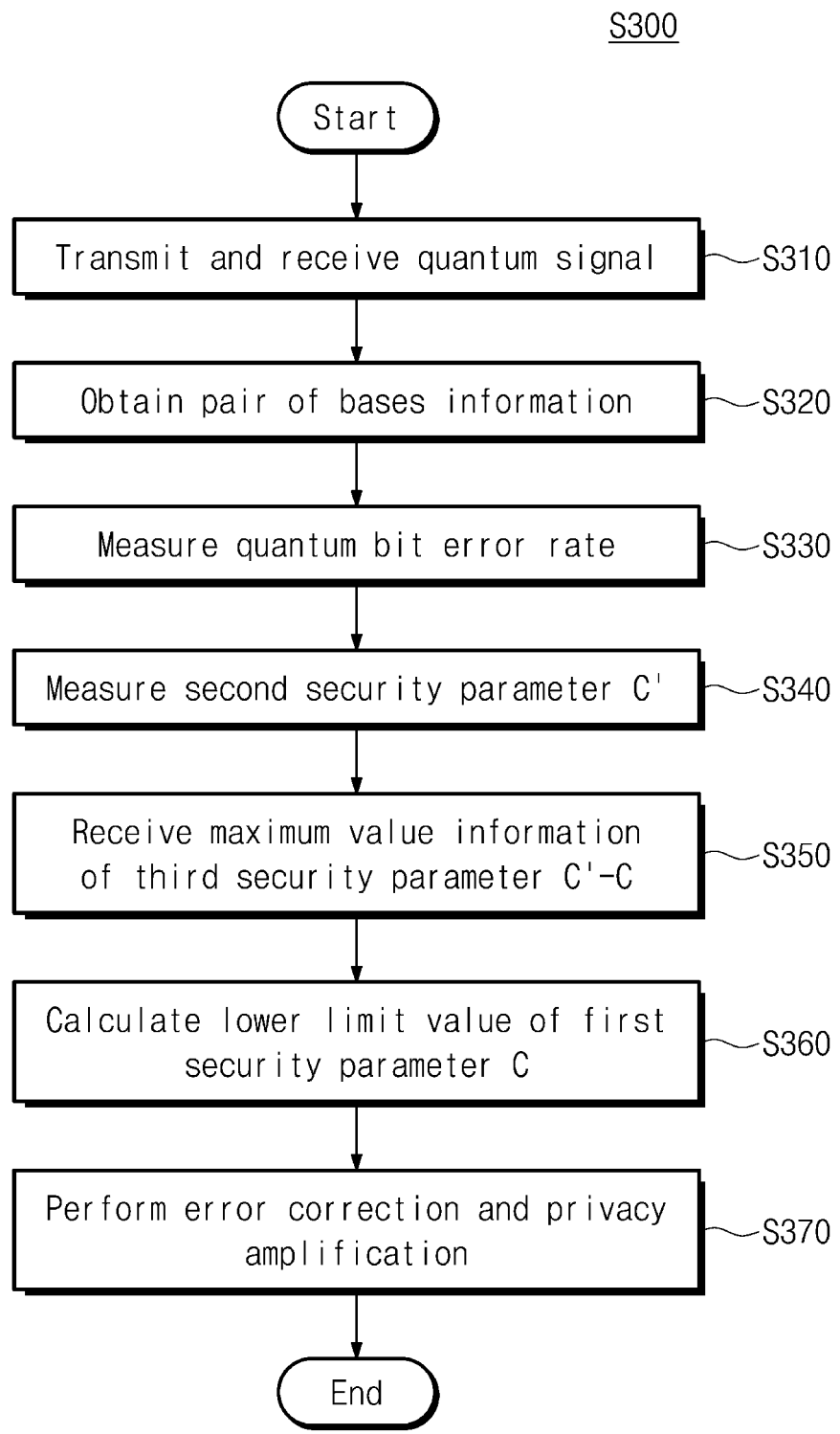
FIG. 6 is a flowchart illustrating a method of operating a quantum key distribution system according to an embodiment of the present disclosure.

FIG. 6 is a flowchart illustrating a method of operating a quantum key distribution system according to an embodiment of the present disclosure. Referring to FIGS. 1, 4, 5, and 6, the QKD system 10 may perform a post-processing operation by calculating the lower limit of the first security parameter C. Operations S310, S320, S330, S340, and S370 are similar to operations S210, S220, S230, S240, and S250 of FIG. 5, and thus a detailed description thereof will be omitted.

The QKD system 10 may transmit and receive the quantum signal in operation S310, and may obtain the pair of bases information in operation S320. In operation S330, the QKD system 10 may measure the QBER based on the first pair of bases $Y_A Y_B$. In operation S340, the QKD system 10 may measure the second security parameter C' based on some of the second pairs of bases $Z_A Z_B$, $Z_A X_B$, $X_A Z_B$, and $X_A X_B$ and Equation 5.

In operation S350, the QKD system 10 may receive the maximum value information of the third security parameter C'−C in consideration of the realistic condition of Equation 5 as well as the ideal condition of Equation 3. The third security parameter C'−C is a value obtained by subtracting the first security parameter C from the second security parameter C', and may be measured and stored at the beginning of manufacturing the QKD system 10. A detailed description thereof will be described later with reference to FIG. 7.

$$Z_B = [Z_A \cos 2(\theta + \theta_1) - X_A \sin 2(\theta + \theta_1)] \cos \phi_1 + Y_A \sin \phi_1$$

$$X_B = [Z_A \sin 2(\theta + \theta_2) + X_A \cos 2(\theta + \theta_2)] \cos \phi_2 + Y_A \sin \phi_2 \qquad \text{[Equation 5]}$$

Referring to Equation 5, 'θ' is a relative value as an angle at which the reference axes of the transmitting device 100 and the receiving device 200 are misaligned, $\theta_1$ and $\theta_2$ are absolute values as a linear polarization component of the polarization generated by the transmitting device 100 and the receiving device 200, and $\emptyset_1$ and $\emptyset_2$ are absolute values as a circular polarization component of the polarization generated by the transmitting device 100 and the receiving device 200.

Since the QKD system 10 should consider the linear polarization component and the circular polarization component of the polarization generated by the transmitting device 100 and the receiving device 200 under the realistic condition, an error may occur when Equation 5 is applied. In this case, the first security parameter C calculated using four bases information may be different from the second security parameter C' calculated using three bases information, which may lead to a security issue.

For example, when the second security parameter C' is greater than the first security parameter C, the QKD system may erroneously estimate that the eavesdropper's eavesdropping possibility is low, thereby causing a security problem. The security parameter is an index related to the amount of information eavesdropped from the eavesdropper. Theoretically, as this value is closer to 2, the QKD system may determine that there is less eavesdropping information. However, when the second security parameter C' is greater than the first security parameter C, it may be erroneously determined that little information is eavesdropped due to the second security parameter C' even though there is actually a lot of eavesdropping information. Accordingly, the QKD system 10 may solve the security issue caused by the second security parameter C' by calculating the lower limit value of the first security parameter C.

In operation S360, the QKD system 10 may calculate the lower limit value of the first security parameter C through Equation 6.

$$C \geq C' - \max_\theta[C'-C] \quad \text{[Equation 6]}$$

Referring to Equation 6, C is the first security parameter, C' is the second security parameter, and $\max_\theta[C'-C]$ is the maximum value of the third security parameter C'-C. The second security parameter C' may be measured in real time in operation S340, and the maximum value of the third security parameter C'-C may be a value stored in the memory in advance. That is, the lower limit value of the first security parameter C may be a value obtained by subtracting the maximum value of the third security parameter C'-C from the second security parameter C'.

In operation S370, the QKD system 10 may perform the error correction operation and the privacy amplification operation based on the QBER and the lower limit value of the first security parameter C.

Figure 7:
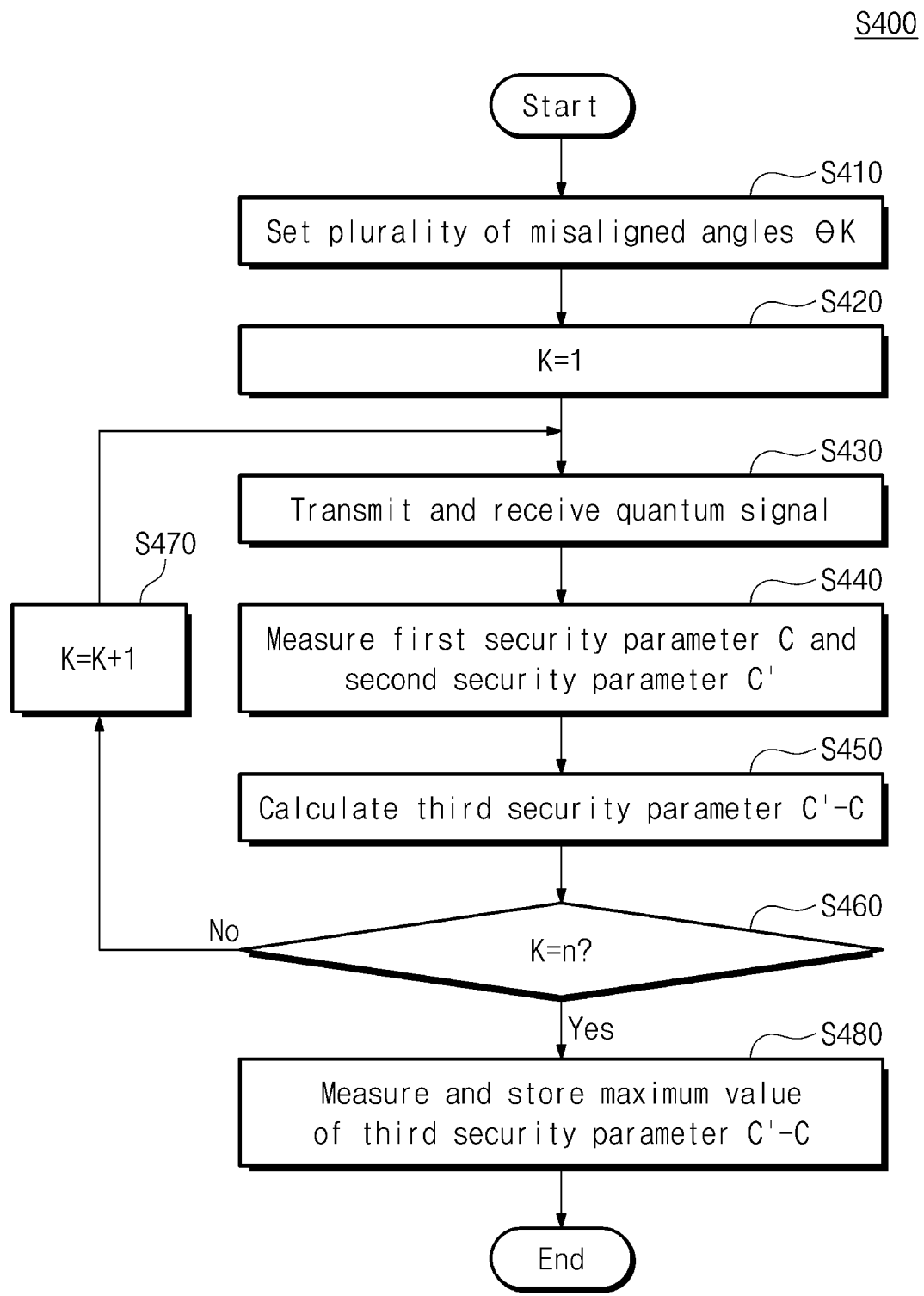
FIG. 7 is a flowchart illustrating an operation method of measuring a maximum value of a third security parameter of FIG. 6.

FIG. 7 is a flowchart illustrating an operation method of measuring the maximum value of the third security parameter of FIG. 6. Referring to FIGS. 1 and 4 to 7, the QKD system 10 may measure and store the maximum value of the third security parameter C'-C at the initial stage of manufacturing the system. According to an embodiment, the QKD system 10 may measure and store the maximum value of the third security parameter C'-C at the initial stage of operation of the system or periodically.

In operation S410, the QKD system 10 may set an angle θ at which the reference axes of the transmitting device 100 and the receiving device 200 are misaligned. The misaligned angle θ may be set to n (θ1, θ2, . . . θn). Where 'n' is an integer greater than or equal to 2. For example, 'n' may be 3, and the misaligned angles θ1, θ2, and θ3 may be 0°, 90°, and 180°, respectively. One of the integers from 1 to n may be K, and in operation S420, the QKD system 10 may set 'K' to 1. In this case, the misaligned angle θ1 may be 0°.

In operation S430, the QKD system 10 may transmit/receive a quantum signal when the misaligned angle θ1 is 0°. Hereinafter, since operation S430 is similar to operation S110, a detailed description thereof will be omitted. Although not illustrated, the QKD system 10 may further include obtaining the pair of bases information corresponding to operation S120 of FIG. 4 and measuring the QBER corresponding to operation S130 of FIG. 4.

In operation S440, the QKD system 10 may measure the first security parameter C and the second security parameter C'. The QKD system 10 may measure the first security parameter C based on the second pairs of bases $Z_AZ_B$, $Z_AX_B$, $X_AZ_B$, and $X_AX_B$ and Equation 1 as in operation S140 of FIG. 4. The QKD system 10 may measure the second security parameter C' based on some of the second pairs of bases $Z_AZ_B$, $Z_AX_B$, $X_AZ_B$, and $X_AX_B$ and Equation 5, as in operation S240 of FIG. 5.

In operation S450, the QKD system 10 may calculate the third security parameter C'-C by subtracting the first security parameter C from the second security parameter C'. The third security parameter C'-C may be a parameter for solving a security issue when the second security parameter C' is greater than the first security parameter C. That is, the lower limit of the first security parameter C may be set through the third security parameter C'-C, thereby solving the security issue.

In operation S460, the QKD system 10 may determine whether 'K' is 'n'. Where 'n' is an integer set in operation S410, for example, 'n' may be 3. In a first loop, since 'K' is 1, the QKD system 10 may perform operation S470. In operation S470, the QKD system 10 may further increase 'K' by 1, and may perform operations S430 to S460 repeatedly. In operation S460, when 'K' is n, the QKD system 10 may perform operation S480.

In operation S480, the QKD system 10 may measure and store the maximum value of the third security parameter C'-C. Through operations S410 to S470, 'n' third security parameters C'-C with respect to 'n' misaligned angles may be obtained. The QKD system 10 may measure the maximum value among the 'n' third security parameters C'-C. The maximum value of the third security parameter C'-C may be stored in the memory, may be loaded in operation S350 of FIG. 6, and may be used to calculate the lower limit of the first security parameter C.

As described above, the QKD system 10 may implement the RFI QKD protocol using minimum physical characteristics by measuring the second security parameter C' in real time and performing the post-processing operation. In addition, the QKD system 10 may solve the security issue with the case where the second security parameter C' is greater than the first security parameter C by calculating the lower limit of the first security parameter C through the maximum value of the third security parameter C'-C stored in advance. The operation of calculating the maximum value of the third security parameter C'-C may be performed and stored once when the system is manufactured. Accordingly, the QKD system 10 may estimate the eavesdropping possibility of an eavesdropper without the security issue under realistic condition as well as ideal condition.

According to an embodiment of the present disclosure, the QKD system uses a RFI QKD protocol that uses minimum physical characteristics (bases), thereby increasing the operating speed of the QKD system or reducing a cost associated with components for generating or detecting the physical characteristics. In addition, the QKD system calculates the lower limit of the first security parameter C and amplifies the security based on the calculated parameter, thereby increasing the security of the QKD system under realistic condition as well as ideal condition.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A quantum key distribution system based on an RFI (reference frame independent) QKD (quantum key distribution) protocol, the quantum key distribution system comprising:
   a first signal processing circuit configured to generate transmission basis information and transmission bit information;
   a quantum channel transmitter configured to generate a single photon or coherent light, and to modulate the single photon or the coherent light based on the transmission basis information and the transmission bit information to generate a quantum signal;
a quantum channel receiver configured to receive the quantum signal through a quantum channel, and to detect reception bit information from the quantum signal based on reception basis information; and
a second signal processing circuit configured to generate the reception basis information, to transmit the reception basis information to the first signal processing circuit through a public channel, and to receive the transmission basis information from the first signal processing circuit through the public channel,
wherein at least one of the first and second signal processing circuits is configured to measure a plurality of security parameters including first pair of bases information and second pair of bases information based on the transmission basis information and the reception basis information, and to generate a quantum key based on the plurality of security parameters,
wherein the first pair of bases information includes polarization state information associated with a first pair of bases,
wherein the second pair of bases information includes polarization state information associated with a plurality of second pairs of bases, and
wherein the plurality of security parameters includes a first security parameter associated with all of the plurality of second pairs of bases, a second security parameter associated with some of the plurality of second pairs of bases, and a third security parameter calculated based on the first security parameter and the second security parameter.

2. The quantum key distribution system of claim 1, wherein the quantum channel transmitter includes:
a light source configured to generate the single photon or the coherent light;
an intensity modulator connected to the light source and configured to change an intensity of the coherent light when the coherent light is received from the light source;
a quantum information modulator configured to modulate the single photon or the coherent light to include the transmission basis information and the transmission bit information; and
an optical attenuator configured to attenuate an intensity of a signal output from the quantum information modulator to generate the quantum signal.

3. The quantum key distribution system of claim 2, wherein the quantum channel receiver includes:
a quantum information demodulator configured to receive the quantum signal from the optical attenuator through the quantum channel and to demodulate the quantum signal based on the reception basis information; and
a single photon detector configured to detect the reception bit information from the demodulated quantum signal.

4. The quantum key distribution system of claim 1, wherein the first and second signal processing circuits share the transmission basis information and the reception basis information with each other; and
the at least one of the first signal and second signal processing circuits is configured to combine the transmission basis information and the reception basis information to obtain pair of bases information.

5. The quantum key distribution system of claim 4, wherein the first pair of bases is composed of circular polarization components, and
wherein the plurality of second pairs of bases is composed of linear polarization components.

6. The quantum key distribution system of claim 5, wherein the at least one of the first and second signal processing circuits is configured to obtain quantum bit error rate (QBER) information based on the first pair of bases information, and to correct a bit error generated in the reception bit information, based on the QBER information.

7. The quantum key distribution system of claim 6, wherein the third security parameter is a value obtained by subtracting the first security parameter from the second security parameter.

8. The quantum key distribution system of claim 6, wherein the at least one of the first and second signal processing circuits is configured to measure a plurality of third security parameters respectively corresponding to a plurality of pre-stored misaligned angles, and to calculate a maximum value of the plurality of the third security parameters, and
wherein each of the plurality of pre-stored misaligned angles is an angle between a reference axis of the quantum channel transmitter and a reference axis of the quantum channel receiver.

9. The quantum key distribution system of claim 8, wherein the at least one of the first and second signal processing circuits is configured to determine a lower limit value of the first security parameter by subtracting the maximum value of the plurality of the third security parameters from the second security parameter, and to generate the quantum key resulting from privacy amplification which removes an eavesdropped bit from the reception bit information based on the lower limit value of the first security parameter.

10. A method of operating a quantum key distribution system based on an RFI (reference frame independent) QKD (quantum key distribution) protocol, the method comprising:
transmitting and receiving a quantum signal through a quantum channel based on transmission basis information, transmission bit information, reception basis information, and reception bit information;
obtaining pair of bases information including first base pair information including polarization state information for a first base pair and second base pair information including polarization state information for a plurality of second base pairs, the pair of bases information being composed of a combination of the transmission basis information and the reception basis information;
obtaining quantum bit error rate (QBER) information based on the pair of bases information;
measuring a plurality of security parameters based on the pair of bases information;
measuring a first security parameter associated with all of the plurality of second pairs of bases and a second security parameter associated with some of the plurality of second pairs of bases, based on the second pair of bases information;
loading a pre-stored maximum value of a third security parameter;
correcting a bit error of the reception bit information based on the QBER information; and
generating a secret key based on the plurality of security parameters,
wherein the third security parameter is calculated based on the first security parameter and the second security parameter.

11. The method of claim 10, wherein the transmitting and receiving of the quantum signal includes:
generating a single photon or coherent light;
generating the quantum signal by modulating the single photon or the coherent light, based on the transmission basis information and the transmission bit information;
demodulating the quantum signal that passes through the quantum channel based on the reception basis information; and
detecting the reception bit information from the demodulated quantum signal.

12. The method of claim 10, wherein the obtaining of the pair of bases information includes:
obtaining first pair of bases information including polarization state information associated with a first pair of bases;
wherein the first pair of bases is composed of circular polarization components; and
obtaining second pair of bases information including polarization state information associated with a plurality of second pairs of bases;
wherein the second pairs of bases are composed of linear polarization components.

13. The method of claim 12, wherein the obtaining of the QBER information includes:
obtaining the QBER information based on the first pair of bases information; and
correcting the bit error generated in the reception bit information based on the QBER information.

14. The method of claim 12,
wherein the third security parameter is a value obtained by subtracting the first security parameter from the second security parameter.

15. The method of claim 14, wherein the pre-stored maximum value of the third security parameter is a maximum value among a plurality of third security parameters corresponding to a plurality of pre-stored misaligned angles, and
wherein each of the misaligned angles is an angle between a reference axis of a transmitting device and a reference axis of a receiving device.

16. The method of claim 14, wherein the measuring of the security parameters further includes determining a lower limit value of the first security parameter by subtracting the pre-stored maximum value of the third security parameter from the second security parameter.

17. The method of claim 16, wherein the generating of the secret key includes generating the secret key resulting from privacy amplification which removes an eavesdropped bit from the reception bit information based on the lower limit value of the first security parameter.

18. A method of operating a quantum key distribution system based on an RFI (reference frame independent) QKD (quantum key distribution) protocol, the method comprising:
setting a plurality of misaligned angles;
transmitting and receiving a quantum signal based on transmission basis information, transmission bit information, reception basis information, and reception bit information, with respect to each of the plurality of misaligned angles;
measuring a first security parameter and a second security parameter based on the transmission basis information and the reception basis information;
measuring a plurality of third security parameters corresponding to the plurality of misaligned angles based on the first security parameter and the second security parameter; and
measuring a maximum value of the plurality of third security parameters and storing the maximum value, and
wherein each of the plurality of misaligned angles is an angle between a reference axis of a transmitting device and a reference axis of a receiving device.

19. The method of claim 18, wherein the first security parameter is associated with all of a plurality of pairs of bases composed of linear polarization components,
wherein the second security parameter is associated with some of the plurality of pairs of bases composed of the linear polarization components, and
wherein the third security parameter is a value obtained by subtracting the first security parameter from the second security parameter.

* * * * *